(12) United States Patent
Champlin et al.

(10) Patent No.: US 12,297,949 B2
(45) Date of Patent: May 13, 2025

(54) IN-PIPE DEVICE CATCHER

(71) Applicants: Craig Loren Champlin, Golden, CO (US); Erik Karl Charrier, Arvada, CO (US)

(72) Inventors: Craig Loren Champlin, Golden, CO (US); Erik Karl Charrier, Arvada, CO (US)

(*) Notice: Subject to any disclaimer, the term of this patent is extended or adjusted under 35 U.S.C. 154(b) by 972 days.

(21) Appl. No.: 17/358,358

(22) Filed: Jun. 25, 2021

(65) Prior Publication Data
US 2021/0404593 A1    Dec. 30, 2021

Related U.S. Application Data

(60) Provisional application No. 63/044,236, filed on Jun. 25, 2020.

(51) Int. Cl.
F16L 55/46    (2006.01)

(52) U.S. Cl.
CPC .................. F16L 55/46 (2013.01)

(58) Field of Classification Search
CPC ....................................... F16L 55/46
See application file for complete search history.

(56) References Cited

U.S. PATENT DOCUMENTS

| | | | | |
|---|---|---|---|---|
| 3,115,782 A | * | 12/1963 | Echtler, Jr. .......... | G01N 1/2035 73/864.62 |
| 3,174,332 A | | 3/1965 | Echtler, Jr. et al. | |
| 3,336,509 A | * | 8/1967 | Atherton .............. | H01F 6/005 327/527 |
| 3,722,903 A | * | 3/1973 | Jones .................. | A63C 11/221 403/109.5 |
| 4,002,059 A | * | 1/1977 | Jeffers ................. | G01N 17/00 73/86 |
| 4,179,920 A | | 12/1979 | Schuller et al. | |

(Continued)

FOREIGN PATENT DOCUMENTS

| | | |
|---|---|---|
| EP | 3336509 B1 | 6/2018 |
| RU | 2225979 C1 | 9/2002 |

OTHER PUBLICATIONS

Aganova, Aganova presenta Nautilus en SMAGUA 2017, 2017, https://www.youtube.com/watch?v=bSAzRDnrsow (Year: 2017).*

(Continued)

*Primary Examiner* — Stephen A Vu
(74) *Attorney, Agent, or Firm* — Stanley J. Gradiar Attorney At Law, LLC; Stanley J. Gradisar

(57) ABSTRACT

Disclosed is a mechanism for extracting smaller than pipe diameter (STPD) devices which are freely moving through a pipeline. While other functions are possible, current state of the art uses STPD balls to inspect difficult to inspect pipelines. Disclosed is a novel means for extracting these STPD devices once their mission within the pipe is complete. Since the mechanism collapses during the insertion and retrieval phases, it is able to extract a STPD device from an opening in the mainline pipe which is only slightly larger than maximum diameter of the STPD device being retrieved. The disclosed mechanism is optimized to make it especially useful for retrieving STPD devices from pipes which are operating under difficult flow conditions such as low or high velocities, or high-pressure, or with high viscosity.

23 Claims, 10 Drawing Sheets

(56) References Cited

U.S. PATENT DOCUMENTS 5,349,874 A * 9/1994 Schapira ................ G01N 17/00
73/864
8,616,074 B2 * 12/2013 Kearns .................... F16L 55/46
285/284.1

OTHER PUBLICATIONS

Agnova Group Nautilus System brochure, 2017 (Year: 2017).*
The Wayback Machine—https://web.archive.org/web/20200601064933/http://www.agaova.es:980/; Jun. 1, 2020; downloaded on Aug. 23, 2021.
Agnova GROUP brochure; publication date unknown, but at least as of Jun. 1, 2020.
RECON+ Capture Net Use; disclosed to applicant on Oct. 23, 2020.

* cited by examiner

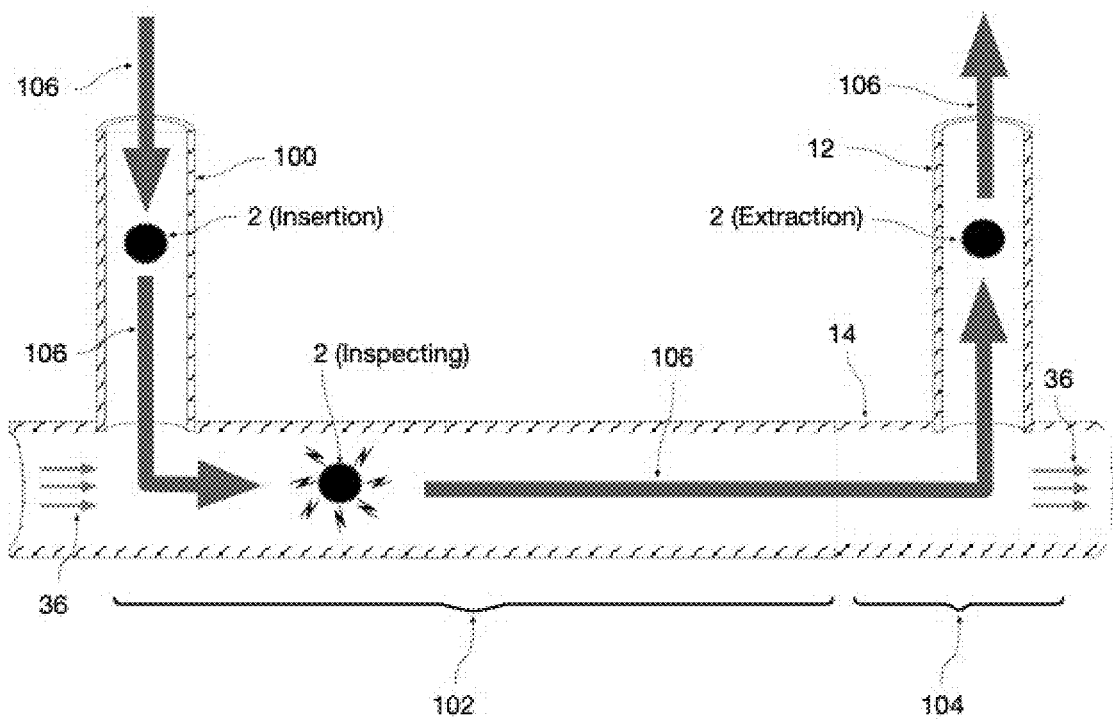
FIG. 1 Prior Art/Non Prior Art
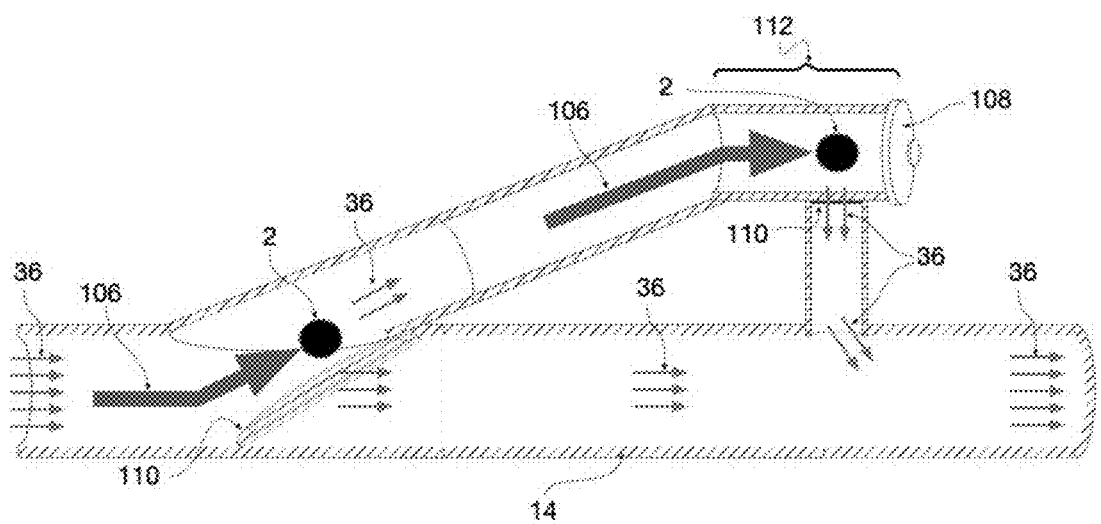
FIG. 2 Prior Art

IN-PIPE DEVICE CATCHER

CROSS-REFERENCES TO RELATED APPLICATIONS

This application claims the benefit of U.S. Provisional Application Ser. No. 63/044,236 filed on Jun. 25, 2020 and titled "IN-PIPE DEVICE CATCHER" which is incorporated herein by reference in its entirety for all that is taught and disclosed therein.

FIELD OF THE INVENTION

This invention pertains to catching and extracting a smaller-than-pipe-diameter (STPD) device as it moves through a gas, hazardous liquid, or other pipeline that is operating under challenging circumstances. Some of the challenges this invention addresses are pipelines which may be transporting slurries or other high-density fluids, pipelines flowing at high volumes or high velocities, and pipelines operating at high-pressures.

BACKGROUND OF THE INVENTION

1. Inspection with STPD Devices.

FIG. 2 shows a stylized version of a pig receiver as known in the prior art. Referring now to FIG. 2, traditionally, operational pipelines have been inspected by flow-driven devices called "pigs" which operate by partially blocking the pipeline bore creating a pressure differential which propels the device through the pipe. To achieve this driving pressure differential a pig's outer diameter must be approximately the same diameter as the internal bore of the pipe such that it at least partially blocks the flow. This blockage results in a low-pressure region in front of the device which pulls it forward. In traditional pigging, pigs are loaded into a pig launcher, an assembly of bypass tubes and valves which allows an operator to insert a pig into the pipeline flow. A similar device, called a pig receiver is at the other end of the inspection segment as shown in FIG. 2. Pig launchers and receivers rely on bars 110 across the mainline bore which divert the pigs 2 along the STPD device path 106 into an extraction chamber 112 while allowing the bulk of the product flow direction 36 to continue unimpeded through the mainline bore 14. Pig receiver pressure door 108 allows access to the extraction chamber 112.

There are some circumstances, however, where inspecting pipes with pigs is not possible or is not desirable. Under these circumstances a STPD device can be used instead. One such device floats freely down the centerline of the operational pipeline and records the signal from several instruments as it travels along the pipe's length. Another device in this class rolls along the bottom of the pipeline. Other types of devices are being developed with other characteristics. Because these devices are small, they are able to navigate obstructions under flow conditions which would make traditional inspection pigs unfeasible.

The current generation of STPD devices for oil and gas or water pipeline inspections use traditional launchers and receivers for insertion and extraction into/from the mainline flow as shown in FIG. 2. Since STPD devices are an alternate inspection technique, however, there are abundant reasons why an operator may be unwilling or unable to install pig launchers or pig receivers on a pipeline. In fact, it is this unwillingness or inability to use traditional launchers and receivers that is the primary motivator of STPD devices. To that end, it is necessary to develop deployment and retrieval techniques for STPD devices which do not rely on traditional pig launchers and receivers. For the purpose of the current invention, we will define a STPD device as any object which is free moving and is smaller than the pipe diameter regardless of its form or function.

Since STPD devices are, by definition, smaller than the pipe diameter there is some opportunity to insert and extract them through a side pipe 12, which has an internal bore which is smaller than the pipe diameter that can be affixed to the side of the mainline pipe 14 as shown in FIG. 1. In high-pressure pipelines these side pipes 12 will be configured as double-valve chambers 13 which are attached to the mainline pipe 14 via a proximal full bore valve 4 and are fitted with a bleed valve 6 for pressure equalization as shown in FIGS. 3 and 4. There are multiple companies that can install these pipes 12 with chambers 13 onto the side of in-service pipelines through a process called "hot tapping", which is known in the art, to allow fluid communication between pipe 12 and mainline pipe 14.

2. Corrosion Coupon Insertion

FIG. 3 shows a stylized version of a corrosion coupon insertion/extraction chamber as known in the prior art. Referring now to FIG. 3, the mechanism 1 described herein will extend the use of an insertion/extraction device which is similar to the one used to insert and extract corrosion coupons into operational pipelines. Corrosion coupons are bare metal strips which are weighed, inserted into the pipeline for several months, then removed and weighed again.

A coupon insertion/extraction device, as shown in FIG. 3, has two main components; (1) a double-valve chamber 13 within pipe 12 which serves as an airlock, or pressure equalization chamber, for passing a steel coupon 22 from the ambient pressure outside the pipe 12 into the pressurized mainline pipe 14, and (2) an actuator rod 8 which is able to move up and down in and out of the double-valve chamber 13 within pipe 12 by way of a pressure sealed packing gland 18 in the chamber lid 20. Once the chamber lid 20 is sealed, the full-bore valve 4 is opened, and the pressure inside the pipe 12 is equalized with the mainline pipe 14 using the bleed valve 6. The actuator rod 8 is used to move the corrosion coupon 22 from the pipe 12 through the portal 10 into the mainline pipe 14. This process is reversed to extract the corrosion coupon 22 from the mainline pipe 14 thereby sealing the chamber to the mainline pipe 14 and thus allowing the corrosion coupon 22 to be returned to the ambient pressure outside the pipe 12.

The whole device is affixed to a tee plate 16 over a portal opening 10 in the mainline pipe 14. The internal diameter of the pipe 12 and the matching portal diameter 10 may be the same size or smaller than the internal diameter of the mainline pipe 14.

SUMMARY OF THE INVENTION

This summary is provided to introduce, in a simplified form, a selection of the concepts that are further described below in the Detailed Description. This Summary is not intended to identify key or essential features of the claimed subject matter, nor is it intended to be used to limit the scope of the claimed subject matter.

The invention described herein is a mechanism 1 and a method for the extraction of a STPD device from an operational gas, hazardous liquid, or other pipeline. This mechanism 1 is particularly relevant to, but not limited to, inserting and extracting STPD inspection devices when it is difficult or impossible to install traditional pig launchers and receivers and when the pipeline is operating under challenging circumstances—such as the fluid in the pipeline is moving at high velocities, or the fluid is extremely viscous, or even a slurry. The basic premise of the mechanism 1 is that it is able to retrieve a STPD device without traditional launchers and receivers by way of STPD portals which have been installed into the pipe sidewall through hot-tapping or other means. This is important because STPD devices are frequently used for difficult to inspect pipelines. A common element of difficult to inspect pipelines is that they often lack traditional pig launchers and receivers. The mechanism 1 and the method are intended to bridge this gap by providing a way to remove STPD inspection devices from an operational pipeline when a pig launcher and pig receiver are unavailable.

BRIEF DESCRIPTION OF THE DRAWINGS

FIG. 1 shows the lifecycle of a STPD device as it moves through the pipe via STPD deployment 102 as known in the prior art.

FIG. 2 shows a stylized version of a pig receiver as known in the prior art.

Figure 3:
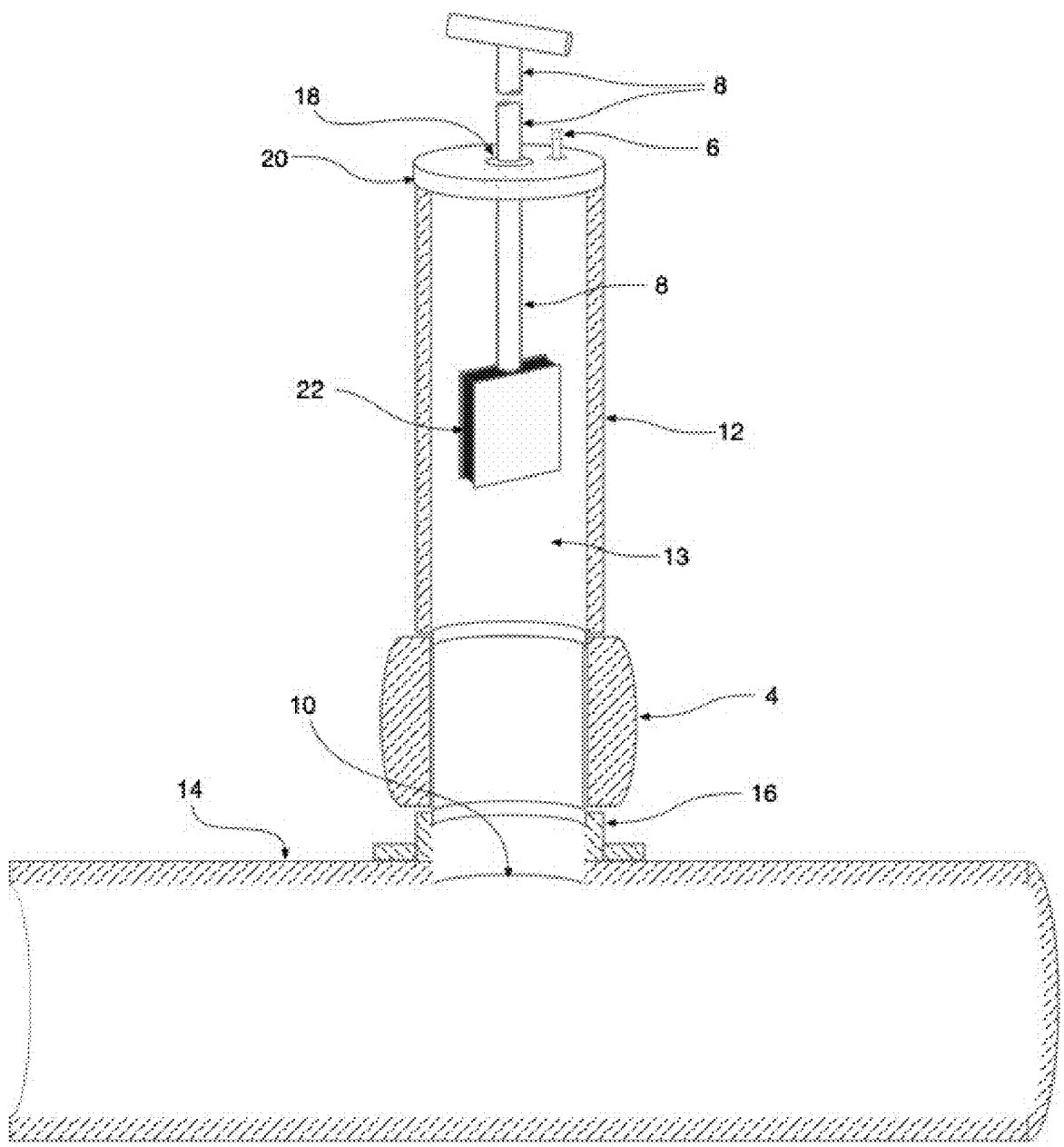
FIG. 3 shows a stylized version of a corrosion coupon insertion/extraction chamber as known in the prior art.

To assist in the understanding of the present disclosure the following list of components and associated numbering found in the drawings is provided herein:

| Table of Components. | |
|---|---|
| Component | # |
| Mechanism | 1 |
| STPD Device | 2 |
| Full-Bore Valve | 4 |
| Bleed Valve | 6 |
| Actuator Rod | 8 |
| Portal | 10 |
| Pipe | 12 |
| Double-Valve Chamber | 13 |
| Mainline Pipe | 14 |
| Tee Plate | 16 |
| Packing Gland | 18 |
| Chamber Lid | 20 |

| Table of Components. | |
|---|---|
| Component | # |
| Corrosion Coupon | 22 |
| Upper Slider | 24 |
| Lower Slider | 26 |
| Upper Hinge | 28 |
| Lower Hinge | 30 |
| Capture Net | 31 |
| Hoop Assembly | 32 |
| Shaft | 34 |
| Utility Channel | 35 |
| Flow Direction | 36 |
| Net assembly | 38 |
| Actuator drive mechanism | 40 |
| Net Cod | 42 |
| Hoop Pivot | 44 |
| Radial Force | 46 |
| Upper Plate | 48 |
| Lower Plate | 50 |
| Hoop | 52 |
| Net Attachment Holes | 54 |
| Net Bridle | 58 |
| Net Mouth | 60 |
| Net Throat | 62 |
| Sinker | 64 |
| Otter Board | 66 |
| Pinned Connection | 68 |
| Reaction Forces | 70 |
| Insertion Tube | 100 |
| STPD Deployment | 102 |
| STPD Extraction | 104 |
| STPD Device Path | 106 |
| Pig Receiver Pressure Door | 108 |
| Pig Bars | 110 |
| Extraction Chamber | 112 |
| Depth Gauge | 114 |
| Rotation Gauge | 116 |
| Detection Sensor Assembly | 118 |
| Device/Net Fouled Indicator | 120 |
| Shaft locking mechanism | 122 |
| Axial Direction | 124 |
| Radial Direction | 126 |

DETAILED DESCRIPTION

Referring now to the Figures, like reference numerals refer to structurally and/or functionally similar elements thereof.

1. STPD Device Overview

Referring now to FIG. 1, the lifecycle of a STPD device is shown. The left portion of this figure, identified by the bracket STPD Deployment 102, is known in the prior art and depicts the dropping of a STPD device 2 (Insertion) into the mainline pipe 14 via a STPD insertion tube 100. The STPD device 2 (Inspecting) follows the STPD device path 106 inspecting the mainline pipe 14 until it needs to be extracted. The extraction portion of this lifecycle, identified by the bracket labeled as STPD Extraction 104, is not known in the prior art and is the focus of the current invention. The objective of the extraction portion of the STPD inspection lifecycle is to pluck the STPD device 2 (Extraction) from the mainline pipe 14 in the flow direction 36 via a pipe 12 so that the STPD device 2 can be returned to the ambient environment outside the pipe 12. The invention described herein includes both an appropriate extraction mechanism 1 and the process method steps required to perform the extraction.

Referring now to the prior art shown in FIG. 3, the current invention builds upon the prior art of a corrosion coupon insertion/extraction tool as described in the BACKGROUND section of this disclosure. The operation of the novel mechanism described herein relies on three preexisting elements of corrosion coupon insertion/extraction tools. (1) First, the current invention uses STPD portals 10 that are punctuated by tee plates 16 which are affixed to operational mainline pipe 14 sidewalls thus allowing STPD sections of pipe 12 to be attached to the side of the mainline pipe 14. (2) Second, the current invention relies on the existence of a pressure equalizing double-valve chamber 13 within pipe 12 between the mainline pipe 14 and an exterior environment, or in low-pressure environments, an upright pipe 12 which exceeds the height of the pressure head. With respect to high-pressure environments, the connection between the mainline pipe 14 and the pipe 12 requires a full-bore valve 4 (typically a ball valve or equivalent). Pressure equalization between the double-valve chamber 13 and either the main line pipe 14 or the exterior environment requires a bleed valve 6 which is used to vent gasses while pressurizing and depressurizing the double-valve chamber 13. (3) Third, the current invention relies on an actuator rod 8 which can slide in and out of the pressure equalized double-valve chamber 13 by means of a packing gland 18 in the chamber lid 20. This packing gland 18 allows the shaft 34 to move while maintaining the pressure differential between the double-valve chamber 13 and the exterior environment. With respect to low-pressure applications, the chamber within pipe 12 may be fastened directly to the tee plate—eliminating the full-bore valve 4 and the bleed valve 6. In this low-pressure configuration, the packing gland 18 may be replaced by a bushing which serves to guide the sliding motion of the actuator rod 8. Since this low-pressure configuration is a simpler subset of the high-pressure configuration, the remainder of this disclosure will focus mainly on the high-pressure configuration with the understanding that the low-pressure regime is a simpler case for which the current invention also applies.

Figure 4:
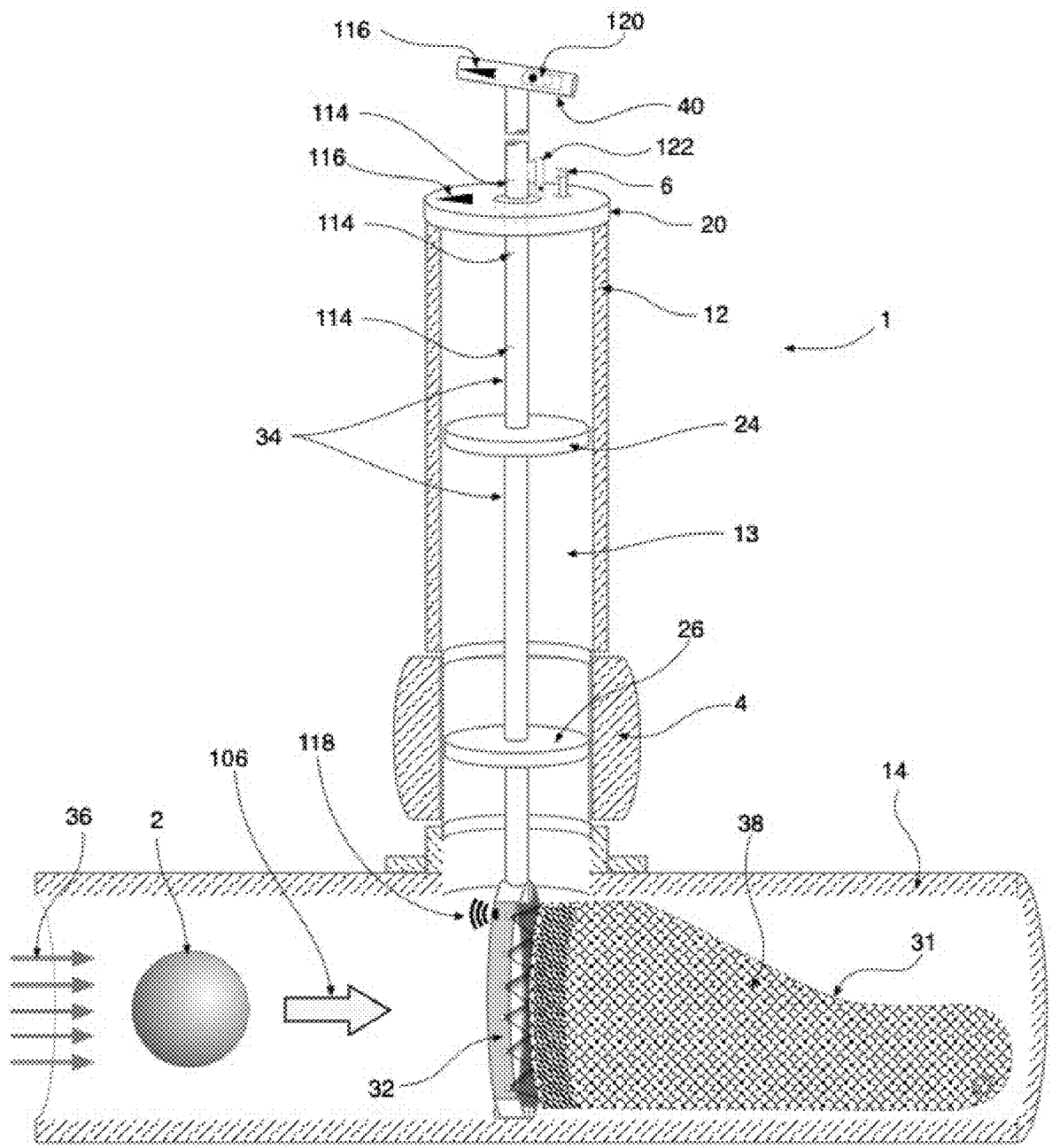
FIG. 4 shows an overview of the main elements in cross-section of an embodiment of the present invention.

Referring now to FIG. 4 with respect to a high-pressure environment, various major components of an embodiment of mechanism 1 that exceeds that of the prior art are shown. The mechanism 1 consists of (1) a capture net 31 and its component elements, hoop assembly 32 and net assembly 38; (2) shaft 34 with at least one support element attached to the shaft 34; and (3) operational elements including a depth gauge 114, a rotation gauge 116, a detection sensor assembly 118, and a device/net fouled indicator 120.

Figure 10:
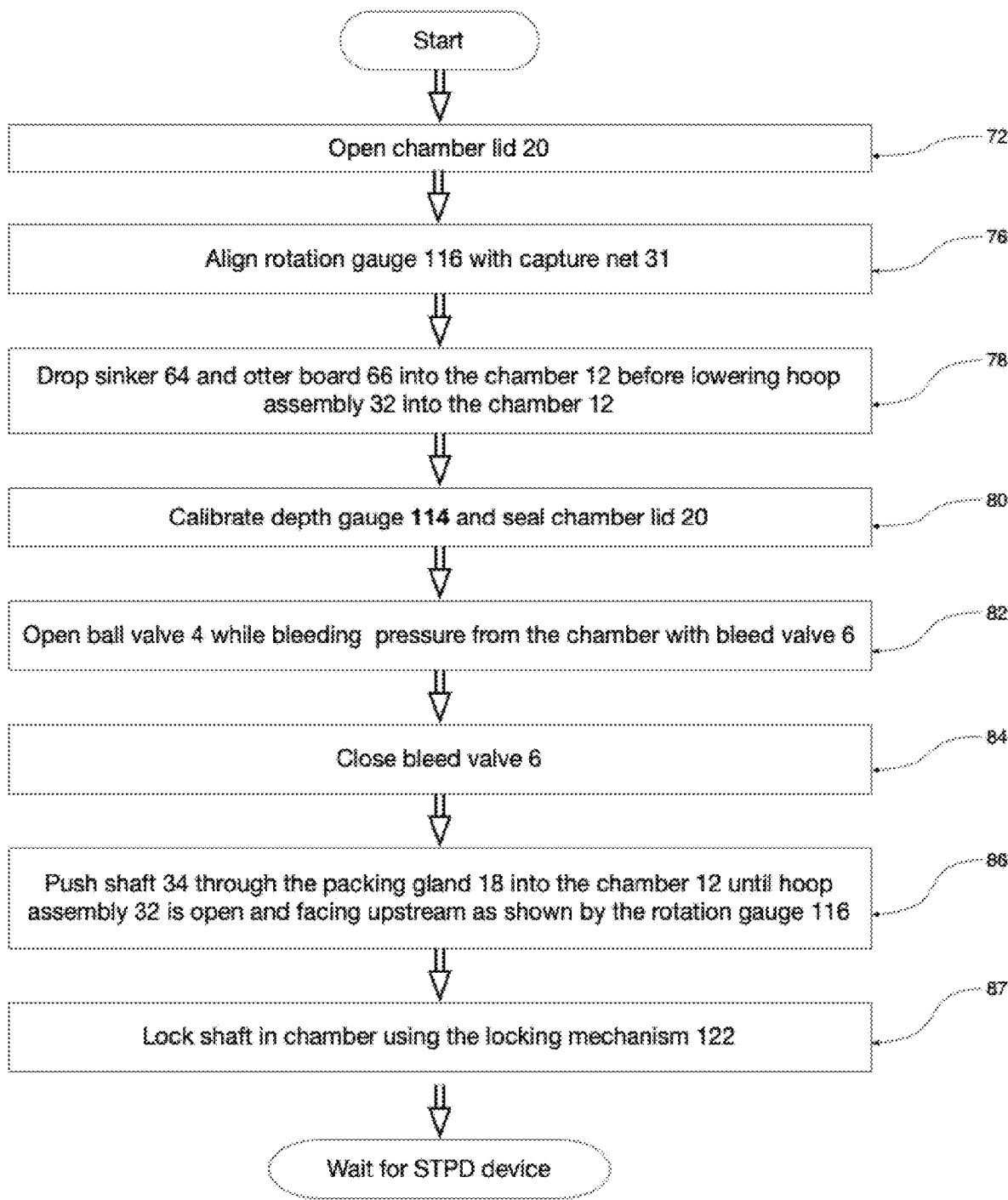
FIG. 10 shows a process flow diagram for the method of insertion of the mechanism into the mainline pipe in an embodiment of the present invention.
Figure 11:
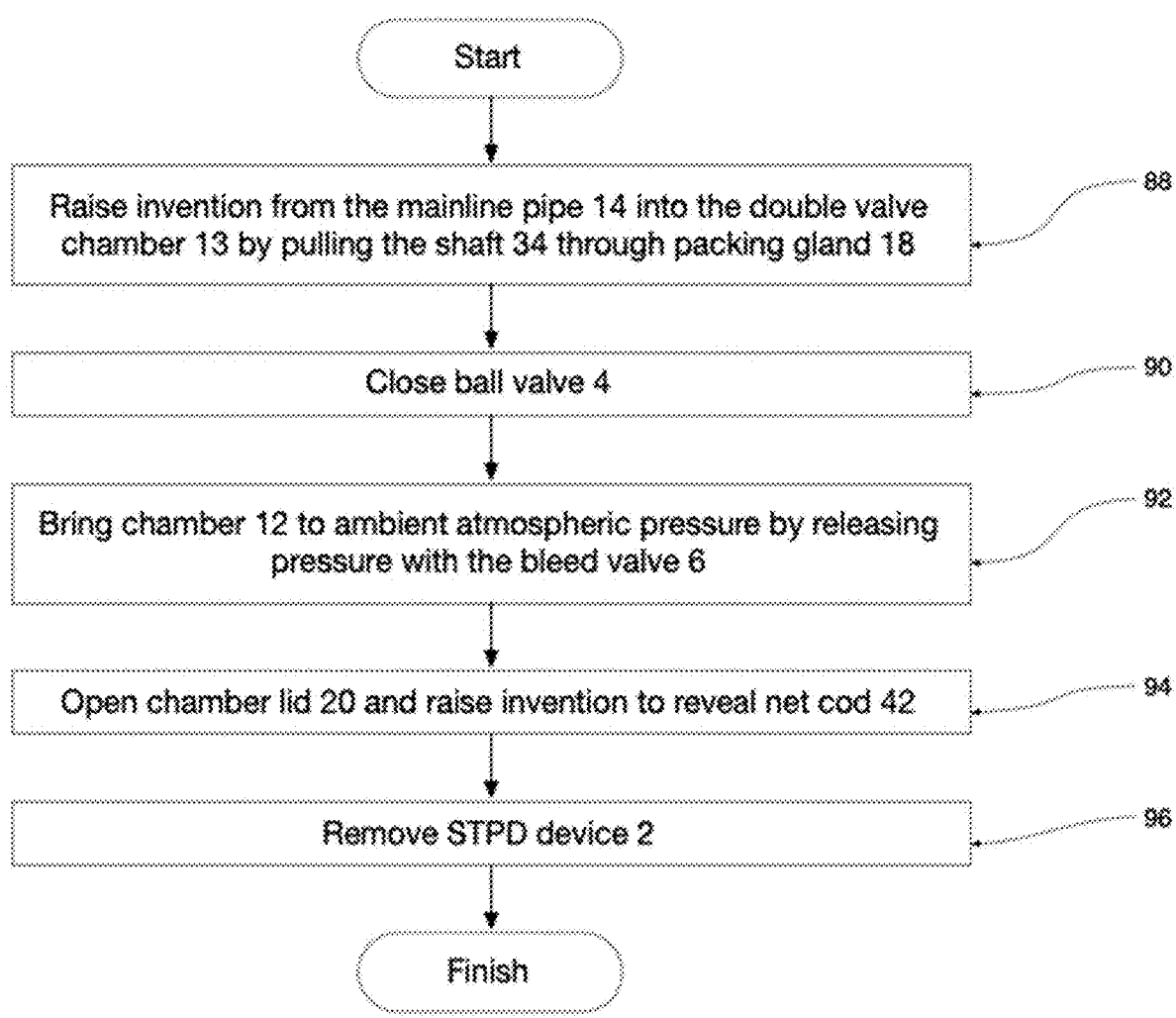
FIG. 11 shows a process flow diagram for the method of extraction of the mechanism from the mainline pipe in an embodiment of the present invention.

The components of the capture net 31 are the hoop assembly 32, which holds the capture net 31 open, and the net assembly 38, which captures the STPD device 2. The shaft 34 provides structure to the mechanism 1. The upper slider 24 and lower slider 26 center the shaft 34 in the double-valve chamber 13 and serve as bearing surfaces which resist lateral forces imputed during the extraction process as shown in FIGS. 10 and 11. There can be a single support 26 around a midpoint of shaft 34, or alternatively, an upper slider 24 located near the top end of shaft 34 and lower slider 26 located near the bottom end of shaft 34. The other part associated with the shaft is the actuator drive mechanism 40 which controls the depth and angle of insertion of the mechanism 1. Finally, the operational elements support the usage of the current invention. The depth gauge 114 indicates if the net assembly 38 and hoop assembly 32 have been fully lowered into the mainline pipe 14, is fully inside the double-valve chamber 13, or is somewhere in between. The rotation gauge 116 indicates the orientation of the capture net 31 allowing the operator to know if the hoop assembly 32 and net assembly 38 are properly oriented along the mainline flow direction 36 so that a STPD device 2 can be captured. The detection sensor assembly 118 detects both the arrival of a STPD device 2 and if the net assembly 38 has been fouled. The status of net assembly 38 fouling or STPD device 2 arrival is displayed on the device/net fouled indicator 120.

2. STPD Device Deployment

Recall from FIG. 1 that the purpose of the current invention is to extract a freely moving STPD device 2 from an operational pipeline. Referring now to an embodiment of the deployment process shown in FIG. 10, reference is made to the numbered elements shown in the other figures and as enumerated in the Table of Components as the process for deployment is described. As a prerequisite to the process, the pipe 12 must be long enough to contain the hoop assembly 32 plus the drooped net assembly 38 and upper and lower sliders 24 and 26 without interfering with the operation of the full-bore valve 4 (see FIG. 9). Additionally, assume that initially both full-bore valve 4 and bleed valve 6 are closed and that the pressure in the double-valve chamber 13 is the same as the external pressure outside of pipe 12. For this discussion of FIG. 10, when talking about an element which is not shown in FIG. 10, a reference to a representative figure is placed in parenthesis after mentioning it.

The first step 72 is to open the chamber lid 20 (FIG. 4) to expose the double-valve chamber 13 (FIG. 4) to the external pressure. In the next step 76 the operator calibrates the rotation gauge 116 so that the orientation of the capture net 31 and the hoop assembly 32 and net assembly 38 are known. In the next step 78 the operator lowers the sinker 64 and otter board 66 (FIG. 8) ahead of the hoop assembly 32 and lowers the upper slider 24 and/or lower slider 26 (depending upon whether one or two sliders are used) into the double-valve chamber 13 (FIG. 4) until the mechanism 1 is suspended above either the full-bore valve 4 or the portal 10 for the high-pressure and low-pressure configurations respectively (FIG. 4). In next step 80 the depth gauge 114 (FIG. 4) is calibrated. Additionally, as one skilled in the art will recognize applies only to the high-pressure configuration, the chamber lid 20 is pressure sealed against the double-valve chamber 13 (FIG. 4). For the low-pressure configuration the mechanism 1 can just be lowered through a pipe 12 with an open top. In the next step 82, which one skilled in the art will recognize applies only to the high-pressure configuration, the full-bore valve 4 (FIG. 4) is slowly opened exposing the double-valve chamber 13 (FIG. 4) to pressure from the mainline pipe 14. At the same time the bleed valve 6 (FIG. 4) is used to vent excess gas from the double-valve chamber 13 to the exterior environment until a pressure gauge (not shown) installed on the double-valve chamber 13 indicates that the pressure is equalized.

One skilled in the art will recognize that step 84 only applies to the high-pressure configuration. In step 84, once pressure is equalized the bleed valve 6 (FIG. 4) is closed.

In next process step 86 the capture net 31 (FIG. 4) is deployed into the mainline pipe 14. The shaft 34 should be lowered until the depth gauge 114 indicates that the hoop assembly 32 is at the right depth to be fully opened within mainline pipe 14 and that the rotation gauge 116 indicates that the capture net 31 is oriented along flow direction 36 to capture a STPD device 2 arriving from upstream. If the device/net fouled indicator 120 indicates that the net assembly 38 has not been properly deployed, this step should be repeated until the net assembly 38 has been deployed correctly. The final step 87 is securing the shaft locking mechanism 122 (FIG. 4) so that the net capture 31 can remain in place until the STPD device 2 arrives and is captured in the net assembly 38.

3. STPD Device Extraction

FIG. 11 shows an embodiment of an extraction process of a STPD device 2 from the mainline pipe 14. This process begins when the device/net fouled indicator 120 indicates that a STPD device 2 has been captured (or after a sufficient amount of time to ensure arrival of the STPD device 2 in the net assembly 38). Referring now to the extraction process shown in FIG. 11, reference is made to the numbered elements shown in the other figures and as enumerated in the Table of Components as the process for extraction is described. At the start of this process the following conditions have already been met from the process method steps shown in FIG. 10. For the high-pressure environment the full-bore valve 4 (FIG. 4) is open and the bleed valve 6 (FIG. 4) is closed. The mechanism 1 has been inserted such that the hoop assembly 32 (FIG. 4) is fully open because it is at the maximum calibrated depth in the mainline pipe 14. In the high-pressure environment, the double-valve chamber 13 (FIG. 4) is pressure equalized with the mainline pipe 14 (FIG. 4) and is full of fluid. The shaft 34 (FIG. 4) depth is locked with the shaft locking mechanism 122 (FIG. 4).

Continuing the discussion of FIG. 11, the first step 88 of the extraction process releases the shaft locking mechanism 122 so that the mechanism 1 may be raised from the mainline pipe 14 and into the double-valve chamber 13 by using the actuator drive mechanism 40 to raise the shaft 34 through the packing gland 18 until the mechanism 1 is fully raised, as indicated by the depth gauge 114. This action also lifts the STPD device 2 captured in net assembly 38. Next in step 90, which one skilled in the art will recognize only applies in the high-pressure environment, the full-bore valve 4 is closed which isolates the double-valve chamber 13 (FIG. 4) from the mainline pipe 14 (FIG. 4). In the next step 92, which one skilled in the art will also recognize only applies in the high-pressure environment, the double-valve chamber 13 (FIG. 4) is brought to external pressure by opening the bleed valve 6 (FIG. 4). Next in step 94, as one who is skilled in the art will recognize as applying to the high-pressure configuration, the chamber lid 20 is loosened and removed (FIG. 4). Finally, applying to all pressure configurations, the mechanism 1 is raised from the double-valve chamber 13 and out of the top of pipe 12 revealing the captured STPD device 2 in the net cod 42. Thus exposed, in the next step 96 the STPD device 2 is removed from the capture net 31.

4. Features of the Mechanism

A. Capture Net

Figure 7:
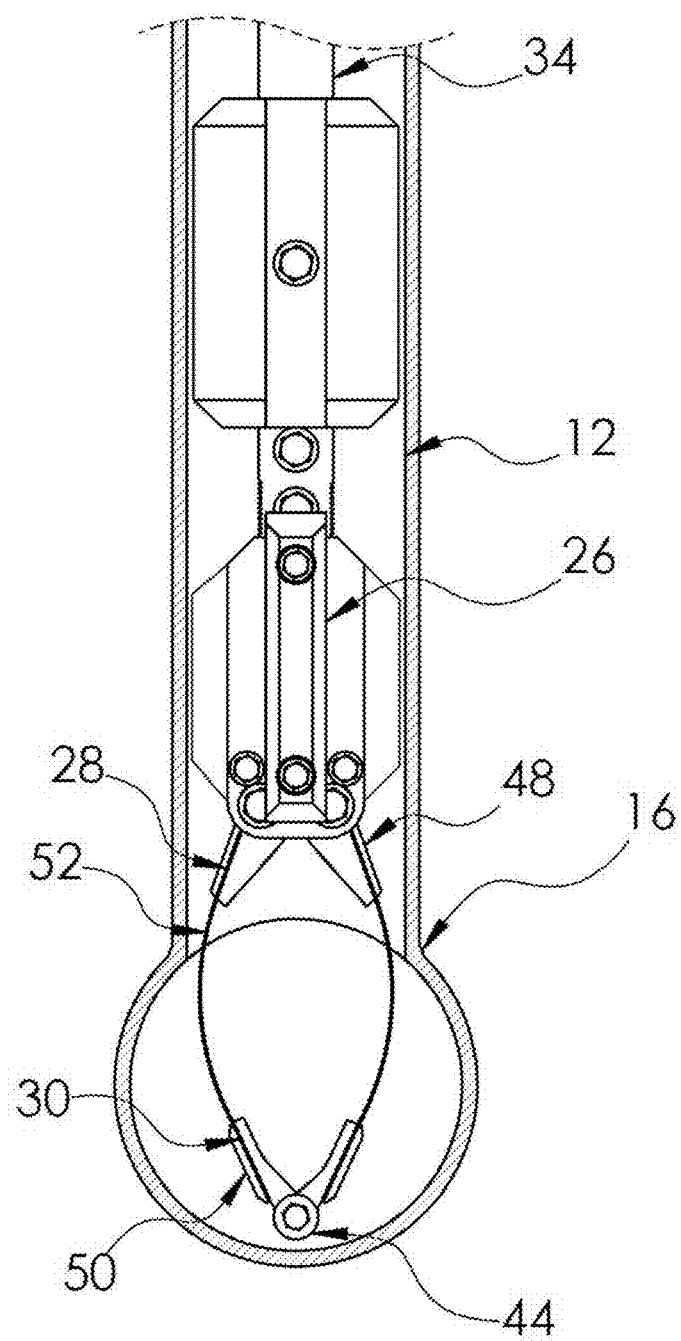
FIG. 7 shows the details in cross-section of the hoop assembly in a neutral position in an embodiment of the present invention.
Figure 9:
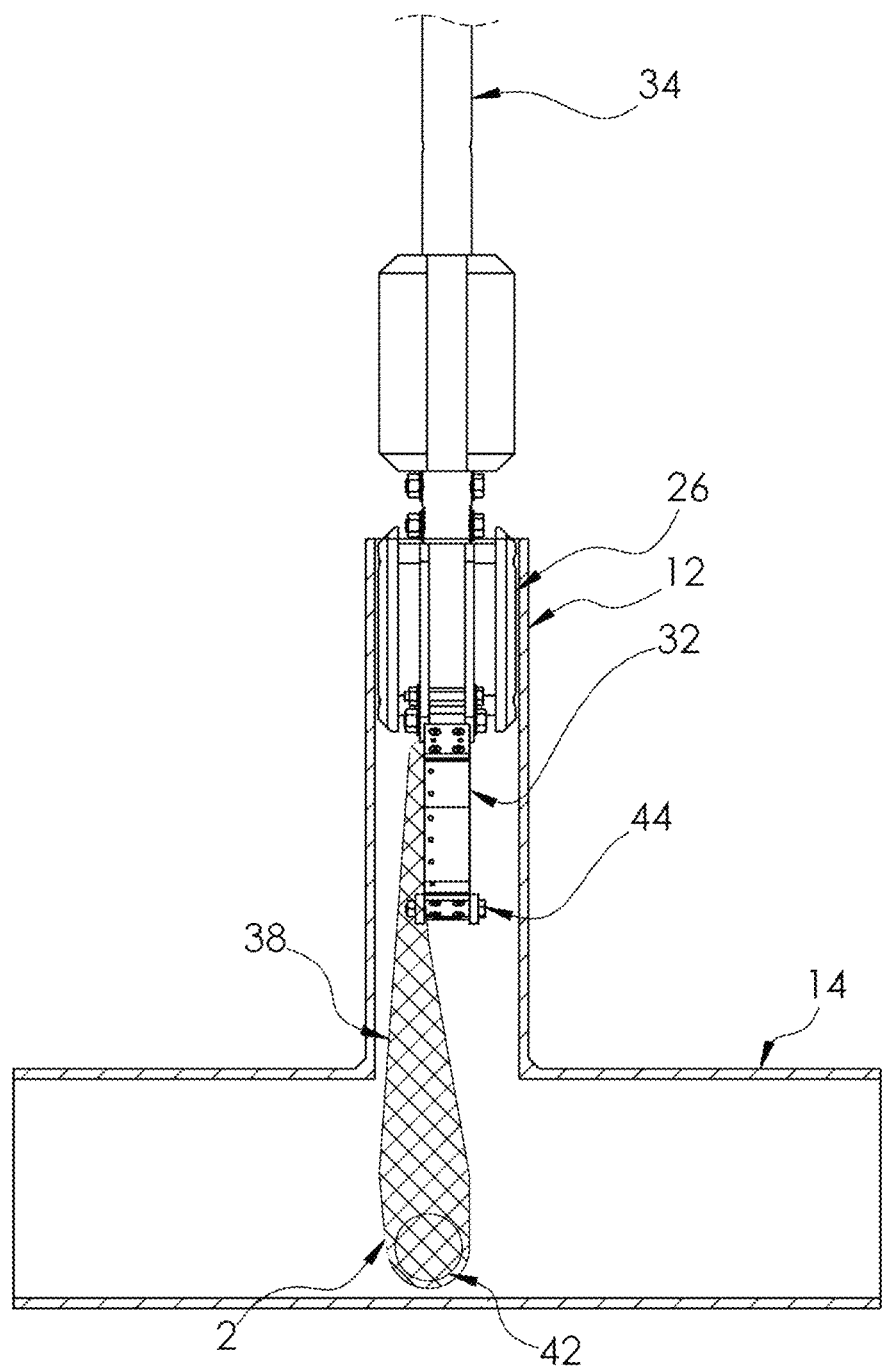
FIG. 9 shows a side view of the capture net that has retrieved a STPD device in an embodiment of the present invention.

The hoop assembly 32 and net assembly 38 are deployed in a collapsed state such that they are able to fit through the double-valve chamber 13 (see FIGS. 7 and 9).

A radial force 46 (see FIG. 6) applied to the shaft 34 results in the reaction forces 70 which cause the hoop 52 to expand to fully encircle the mainline pipe 14, thus exposing the net assembly 38 to an approaching STPD device 2 for capture.

Removing the radial force 46 by withdrawing the mechanism 1 from the mainline pipe 14 back into the double-valve chamber 13 causes the hoop assembly 32 to return to its collapsed state allowing it to fit within the double-valve chamber 13.

The net cod 42 must droop a sufficient amount below the collapsed hoop assembly 32 (see FIG. 9) so that it can fit comfortably within the double-valve chamber 13 after a successful capture.

In the high-pressure configuration the net cod 42 with captured STPD device 2 must fit completely within the double-valve chamber 13 such that it does not interfere with the operation of the full-bore valve 4.

The net assembly 38 is weighted by a sinker 64 attached to the net cod 42 which makes sure the empty net cod 42 enters the mainline pipe 14 in advance of the hoop assembly 32 while the mechanism 1 is being lowered.

In extremely low-flow conditions an optional otter board 66 attached to the net cod 42 is used to amplify a small fluid flow in flow direction 36 in the mainline pipe 14 to assist with pulling the net assembly 38 downstream.

B. Support

The upper and lower sliders 24 and 26 serve to resist buckling when the radial force 46 is applied. Further, these elements resist the bending moment imparted by the mainline flow direction 36 pushing against the capture net 31.

The upper and lower sliders 24 and 26 allow fluids to freely pass, for example by being perforated with holes or by being smaller than the double-valve chamber diameter, so that they don't act like pistons during pressure equalization operation or when the mechanism 1 is being raised or lowered.

C. Operations

There is a mechanical depth gauge 114 on the shaft 34, or alternatively, an electronic gauge (not shown) which shows the depth that the hoop assembly 32 has been inserted into the pipe 12 or the mainline pipe 14.

There is a mechanical rotation gauge 116 on the actuator drive mechanism 40, or alternatively, an electronic gauge (not shown) which indicates the angle that the hoop assembly 32 is oriented, thus enabling the operator to ensure that the capture net 31 is correctly aligned in the mainline flow direction 36.

Detection sensor assembly 118 is comprised of one or more mechanical or electronic sensors which sense if a STPD device 2 has passed into the capture net 31, thus indicating that a STPD device 2 has been captured.

Detection sensor assembly 118 also senses if the capture net 31 has not been deployed correctly and is potentially fouled.

The device/net fouled indicator 120 is a mechanical indicator or alternatively an electronic indicator (not shown) corresponding with the detection sensor assembly 118 which shows if the capture net 31 is fouled and also shows if a STPD device 2 has arrived in the capture net 31.

5. Detailed Descriptions of the Mechanism

FIG. 4 shows a functional view of an embodiment of the present invention in an operational configuration. Here the mechanism 1 is extended through the pipe 12 and into the mainline pipe 14. The mechanism 1 consists of a shaft 34 which ensures a known orientation with respect to the actuator drive mechanism 40. The lower portion the shaft 34 is attached to the hoop assembly 32 which supports the net assembly 38 which captures a free-floating STPD device 2 from the mainline flow direction 36. Support points of upper slider 24 and lower slider 26 serve to counteract the lateral force imparted by the fluid flow and maintain the shaft's 34 centered orientation within the pipe 12. They also help prevent the shaft 34 from buckling when the radial force 46 is applied. While not clearly shown in FIG. 4, it is necessary to preventing pressure lock that the upper slider 24 and lower slider 26 allow the free exchange of fluid between the mainline pipe 14 and the pipe 12 as stated above.

The device/net fouled indicator 120 reports to the operator if the STPD device 2 has arrived, or, if the capture net 31 is fouled and should be redeployed. The detection sensor assembly 118 detects both of these conditions either mechanically, electronically or through other similar means.

The depth gauge 114 is calibrated to allow the operator to know (1) when the mechanism 1 is fully contained within the pipe 12 above the full-bore valve 4, (2) when the mechanism 1 has been lowered into the mainline pipe 14 such that the hoop pivot 44 is in contact with the far wall of the mainline pipe 14, and (3) when the mechanism 1 has been compressed enough via a radial force 46 to fully deploy the net assembly 38 into the mainline flow direction 36.

The rotation gauge 116 indicates if the capture net 31 and the hoop assembly 32 and net assembly 38 are properly aligned with the mainline flow direction 36. Finally, the shaft locking mechanism 122 secures the capture net 31 in the open and deployed position to wait for the arrival of the STPD device 2. Further, when the mechanism 1 is fully retracted from the mainline pipe 14, the shaft locking mechanism 122 retains the depth position of mechanism 1 in the pipe 12 so that the full-bore valve 4 can be opened and closed.

Figure 5:
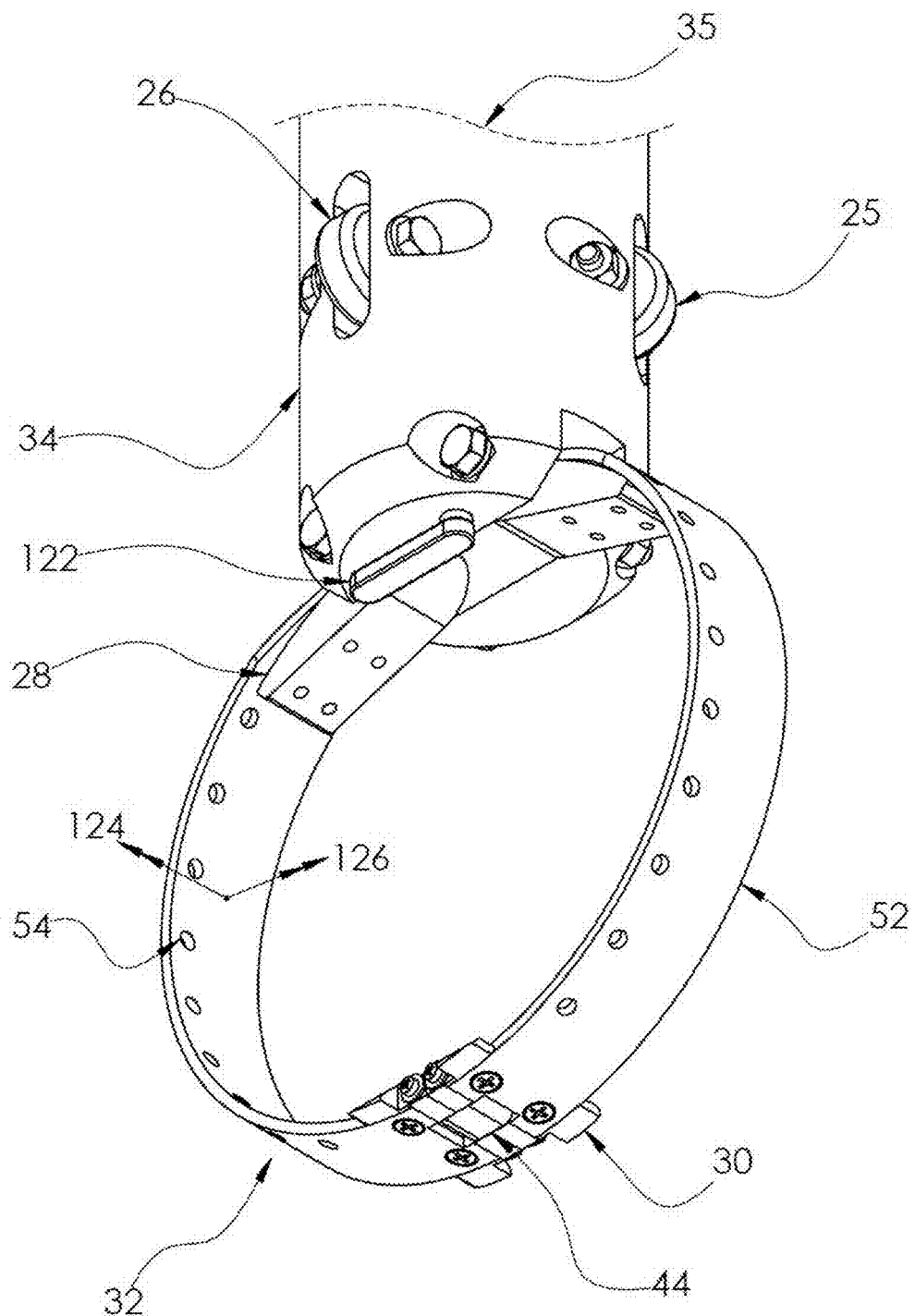
FIG. 5 shows a lower isomorphic detail of the hoop assembly and lower shaft in an embodiment of the present invention.

FIG. 5 shows a lower isometric detailed view of an embodiment of the hoop assembly 32. The perspective of this isometric drawing is from below, slightly off-center from the axial center of the mainline pipe 14, looking upstream. The hoop assembly 32 consists of the following individual parts: the hoop 52, having a first half and a second half, with net attachment holes 54 on both halves; the upper hinge 28 that connects the top portions of both halves of hoop 52; and the lower hinge 30 with an integrated hoop pivot 44 that connects the bottom portions of both halves of hoop 52. This illustration shows the hoop 52 attached to the shaft 34 by the upper hinge 28. The shaft 34 with utility channel 35 extends upwards out of the mainline pipe 14 and into the double-valve chamber 13.

Figure 6:
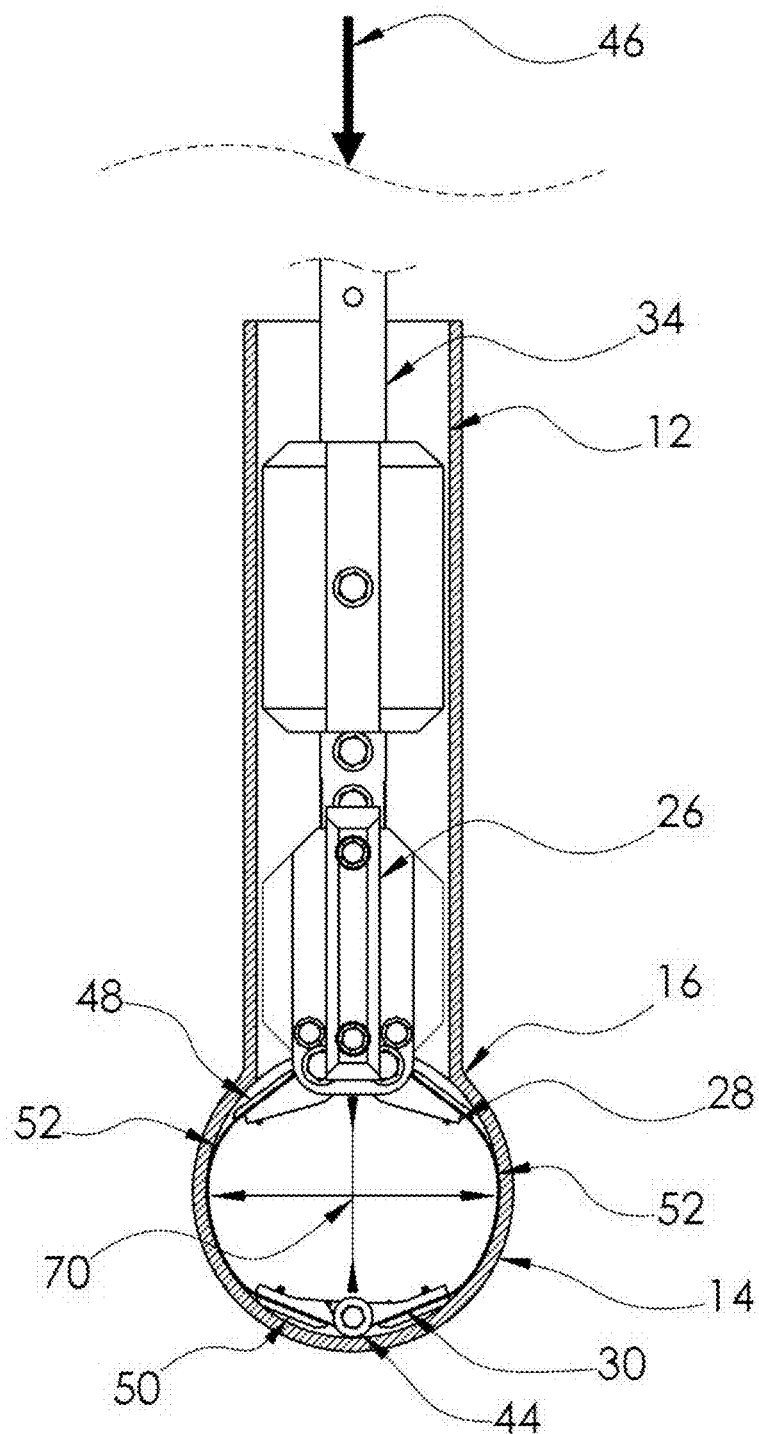
FIG. 6 shows an axial detail in cross-section of the hoop assembly and lower shaft in the context of the mainline pipe and double-valve chamber and the application of a force for hoop opening in an embodiment of the present invention.

Still referencing FIG. 5, the hoop assembly 32 is designed to hold the net assembly 38 (FIG. 4) open and perpendicular to the mainstream flow direction 36. To accomplish this goal the hoop assembly 32 must be able to resist the forces generated along the axial direction 124 of the mainline pipe 14. Additionally, the hoop assembly 32 must be able to collapse in the radial direction 126 so that it can fit into the double-valve chamber 13, which is typically smaller than the internal diameter of the mainline pipe 14. To accomplish these objectives the hoop 52 is constructed of thin material which is bendable through its thickness but rigid through its width, similar to a leaf spring in a car. The upper hinge 28 and lower hinge 30 further allow the hoop assembly 32 to collapse into the double-valve chamber 13 while providing rigidity when the capture net 31 is deployed into the mainline pipe 14. The upper hinge 28 is designed to resist a side-load generated by net assembly 38. The lower hinge 30 includes a hoop pivot 44 which supplies a fulcrum for the hoop 52 opening action. Refer to FIG. 6 for an illustration of the hoop 52 in the open position. Refer to FIG. 7 for an illustration of the hoop 52 in the neutral position.

Finishing up with FIG. 5, the shaft 34 includes utility channel 35 for wires and hydraulic lines (not shown). As stated earlier the lower slider 26 braces the assembly against the pipe 12 walls to resist forces acting on the hoop assembly 32. In this embodiment shown in FIG. 5 (and also in FIG. 8) the lower slider 26 is manifest as four wheels positioned front and rear and right and left to brace against forces generated by the mainline flow direction 36 against the hoop assembly 32. Shaft 34 is offset from the interior walls of pipe 12 by the sliders 24 and 26 allowing the free flow of fluid within double-valve chamber 13. Also shown on the shaft 34 is a different embodiment of the shaft locking mechanism 122 than which is shown in FIG. 4. As stated earlier this shaft locking mechanism 122 allows the capture net 31 to be secured in an open position in the mainline pipe 14 without the need for an applied external force. The actuation of this shaft locking mechanism 122 is accomplished electronically or manually from outside the pipe 12 through the utility channel 35 in the shaft 34 either mechanically or electrically. This feature is functionally interchangeable with the shaft locking mechanism 122 shown in FIG. 4.

Referring now to FIG. 6, an axial view in cross-section of an embodiment of the current invention in the open and deployed position is shown. The application of a radial force 46 through the shaft 34 in the direction of the mainline pipe 14 presses the hoop pivot 44 into the mainline pipe 14 wall which imparts the reaction forces 70 which cause the hoop 52 and upper hinge 28 and lower hinge 30 of the hoop assembly 32 to deflect. This deflection causes the hoop 52 to open, pressing against the inner walls of the mainline pipe 14 which presents the net assembly 38 to the mainline flow direction 36 so that it is able to capture a STPD device 2. In this position a pair of upper plates 48 and a pair of lower plates 50 are wear surfaces which are constructed of soft material to protect the coating on the interior surfaces of the mainline pipe 14.

FIG. 7 shows in cross-section the hoop assembly 32 in a neutral position in an embodiment of the present invention. In this relaxed state the upper hinge 28 and lower hinge 30 work together providing tension to spread the two halves of the hoop 52 apart in the radial direction 126. The hoop halves 52 which are radially compliant, like springs, are flexed slightly outward in this relaxed state so that when a radial force 46 is applied to the hoop halves 52 they are certain to expand outward in the radial direction 126 rather than to flex together in some unpredictable direction. When in the relaxed state the hoop assembly 32 is able to fit into the double-valve chamber 13.

Figure 8:
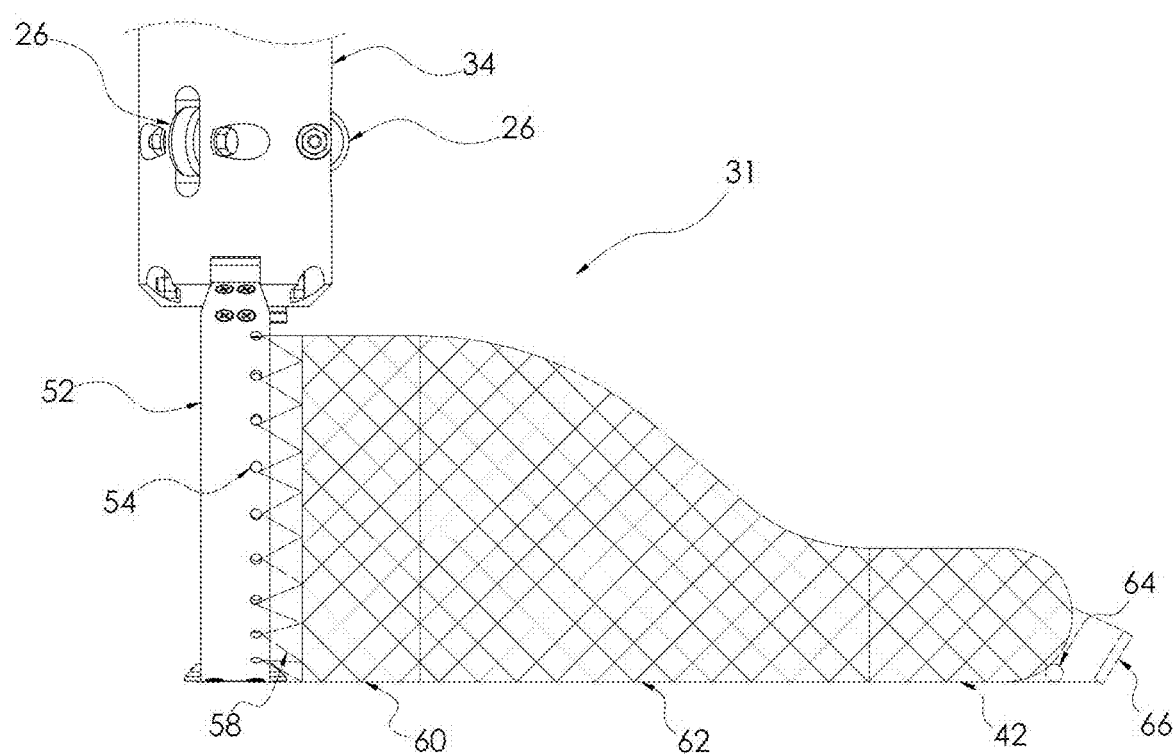
FIG. 8 shows a side view of the deployed capture net in an embodiment of the present invention.

FIG. 8 shows a side view of a deployed net assembly 38 in an embodiment of the present invention. Referring now to FIG. 8, the capture net 31 is attached to the hoop 52 of the hoop assembly 32, which is supported by the shaft 34 and braced by the lower slider(s) 26. The net bridle 58 attaches to the net attachment holes 54 in the hoop 52 and on the other side it attaches to the net mouth 60 and holds it in the shape of the hoop 52 opening. Detection sensor assembly 118 is affixed on or near the hoop 52 to detect STPD devices 2 entering the net assembly 38 and to detect if the net assembly 38 has deployed correctly in the mainline pipe 14. The net throat 62 forms the largest portion of the net assembly 38. As measured from the upper hinge 28, the length of the net mouth 60 plus the net throat 62 is the length of the relaxed hoop assembly 32 from the base of the upper hinge 28 to the hoop pivot 44 plus one half of the diameter of the largest target STPD device 2. The portion of the net assembly 38 beyond this measurement is the net cod 42. The net cod 42 is where the STPD device 2 is held during extraction. It must be long enough to hold the STPD device 2 below the hoop assembly 32 during extraction. Further the net cod 42 should not be excessively long so as to interfere with the operation of the full-bore valve 4, in the high-pressure configuration. See FIG. 9 for clarification about the configuration of the net assembly 38 during the STPD device 2 extraction phase.

Continuing the discussion about FIG. 8, at the distal or terminal end of the net cod 42 is a sinker 64 and/or an otter board 66 which help prevent net fouling during net insertion into the mainline pipe 14. The sinker 64 uses gravity to ensure that the net cod 42 hangs below the hoop assembly 32 while it is lowered into the mainline pipe 14. The otter board 66, which is used in low-flow conditions, catches the mainline flow direction 36 as the net enters the mainline pipe 14 and creates drag which stretches the net assembly 38 into a clean deployment. These two elements may be combined into a single heavy otter board 66/sinker 64. Additionally, electronic or magnetic devices may be integrated with the sinker 64 and/or otter board 66 which work in conjunction with the detection sensor assembly 118 installed in the net mouth 60, net bridle 58, or hoop assembly 32 to detect if the capture net 31 is properly deployed or not. If the detection sensor assembly 118 is in the proximity of the sinker 64 or otter board 66 a signal will be generated which indicates that the net assembly 38 is fouled and should be redeployed.

FIG. 9 shows a side view of the capture net 31 as it retrieves a STPD device 2 from the mainline pipe 14 in an embodiment of the present invention. Referring now to FIG. 9, an STPD device 2 has been captured from the mainline pipe 14. A radial force 46 in the direction away from the mainline pipe 14 is applied to the shaft 34 which pulls the mechanism 1 and the captured STPD device 2 into the pipe 12. Once the hoop pivot 44 is no longer touching the mainline pipe 14 the hoop assembly 32 is in its neutral or relaxed state, as seen in FIG. 7, and is able to fit into the double-valve chamber 13. During this extraction phase, the net cod 42 hangs below the hoop assembly 32. In a purely vertical installation this results in the captured STPD device 2 freely hanging centered below the hoop pivot 42. Since the other elements of the invention can be adjusted, the STPD device 2 prescribes the minimum internal diameter of the double-valve chamber 13 that the mechanism 1 requires. The minimum internal diameter of pipe 12 needs to be at least the diameter of the STPD device 2 plus the thickness of the net on both sides of STPD device 2 (one net thickness plus the diameter of the STPD device 2 plus another net thickness).

Having described the present invention, it will be understood by those skilled in the art that many changes in construction and circuitry and widely differing embodiments and applications of the invention will suggest themselves without departing from the scope of the present invention.

What is claimed is:

1. An apparatus for the extraction of a smaller-than-pipe-diameter (STPD) device from a mainline pipe, the apparatus comprising:
   a shaft having a proximal end and a distal end;
   at least one slider attached to the shaft between the proximal end and the distal end;
   a capture net attached to the shaft at the distal end, the capture net further comprising:
      a hoop assembly, the hoop assembly further comprising:
         a hoop further comprising:
            a width that resists forces in a flow direction along the width; and
            a thickness that is bendable in a radial direction through the thickness; and
      a net assembly attached to the hoop assembly; and
   a rotation gauge located on an actuator drive mechanism located on the proximal end of the shaft that indicates the orientation of the capture net within the mainline pipe.

2. The apparatus according to claim 1 further comprising:
   a depth gauge on the shaft that indicates the location of the net assembly and the hoop assembly within the mainline pipe and within a pipe in fluid communication with the mainline pipe.

3. An apparatus for the extraction of a smaller-than-pipe-diameter (STPD) device from a mainline pipe, the apparatus comprising:
   a shaft having a proximal end and a distal end;
   at least one slider attached to the shaft between the proximal end and the distal end;
   a capture net attached to the shaft at the distal end, the capture net further comprising:
      a hoop assembly, the hoop assembly further comprising:
         a hoop further comprising:
            a width that resists forces in a flow direction along the width; and
            a thickness that is bendable in a radial direction through the thickness; and
      a net assembly attached to the hoop assembly; and
   a device/net fouled indicator located on an actuator drive mechanism that displays if the STPD device has been captured and if the capture net is fouled.

4. An apparatus for the extraction of a smaller-than-pipe-diameter (STPD) device from a mainline pipe, the apparatus comprising:
   a shaft having a proximal end and a distal end;
   at least one slider attached to the shaft between the proximal end and the distal end;
   a capture net attached to the shaft at the distal end, the capture net further comprising:
      a hoop assembly, the hoop assembly further comprising:
         a hoop further comprising:
            a width that resists forces in a flow direction along the width; and
            a thickness that is bendable in a radial direction through the thickness; and
      a net assembly attached to the hoop assembly; and
   a detection sensor assembly affixed to the hoop that detects a capture of the STPD device in the capture net, and detects a fouled capture net.

5. An apparatus for the extraction of a smaller-than-pipe-diameter (STPD) device from a mainline pipe, the apparatus comprising:
   a shaft having a proximal end and a distal end;
   at least one slider attached to the shaft between the proximal end and the distal end;
   a capture net attached to the shaft at the distal end, the capture net further comprising:
      a hoop assembly, the hoop assembly further comprising:
         a hoop further comprising:
            a width that resists forces in a flow direction along the width; and
            a thickness that is bendable in a radial direction through the thickness; and
      a net assembly attached to the hoop assembly; and
      a net bridle at the proximal end of net assembly that is attached to the hoop; and
      a net cod at a distal end of the net assembly.

6. The apparatus according to claim 5 wherein the net assembly further comprises:
   an otter board attached to the net cod.

7. An apparatus for the extraction of a smaller-than-pipe-diameter (STPD) device from a mainline pipe, the apparatus comprising:
   a shaft having a proximal end and a distal end;
   at least one slider attached to the shaft between the proximal end and the distal end;

a capture net attached to the shaft at the distal end, the capture net further comprising:
  a hoop assembly, the hoop assembly further comprising:
    a hoop further comprising:
      a width that resists forces in a flow direction along the width; and
      a thickness that is bendable in a radial direction through the thickness; and
  a net assembly attached to the hoop assembly, the net assembly further comprising:
    a sinker attached to a net cod.

8. An apparatus for the extraction of a smaller-than-pipe-diameter (STPD) device from a mainline pipe, the apparatus comprising:
  a shaft having a proximal end and a distal end;
  at least one slider attached to the shaft between the proximal end and the distal end;
  a capture net attached to the shaft at the distal end, the capture net further comprising:
    a hoop assembly, the hoop assembly further comprising:
      a hoop further comprising:
        a width that resists forces in a flow direction along the width; and
        a thickness that is bendable in a radial direction through the thickness; and
    a net assembly attached to the hoop assembly; and
  a rotation gauge located on an actuator drive mechanism located on the proximal end of the shaft that indicates the orientation of the capture net within the mainline pipe
  a first half of hoop and a second half of hoop;
  an upper hinge that connects a top portion of the first half of hoop to a top portion of the second half of the hoop; and
  a lower hinge having an integrated hoop pivot, the lower hinge connects a bottom portion of the first half of hoop to a bottom portion of the second half of the hoop;
  wherein the upper hinge and the lower hinge provide a tension to keep an outward bend to the first half of hoop and a second half of hoop.

9. The apparatus according to claim 8 wherein the hoop assembly further comprises:
  a first upper plate attached to a top portion of the first half of hoop;
  a second upper plate attached to the top portion of the second half of hoop;
  a first lower plate attached to the bottom portion of the first half of hoop; and
  a second lower plate attached to the bottom portion the second half of hoop.

10. An apparatus for the extraction of a smaller-than-pipe-diameter (STPD) device from a mainline pipe, the apparatus comprising:
  a shaft having a proximal end and a distal end;
  at least one slider attached to the shaft between the proximal end and the distal end;
  a capture net attached to the shaft at the distal end, the capture net further comprising:
    a hoop assembly, the hoop assembly further comprising:
      a hoop further comprising:
        a width that resists forces in a flow direction along the width; and
        a thickness that is bendable in a radial direction through the thickness; and
    a net assembly attached to the hoop assembly; and
  a shaft locking mechanism mechanically connected to the shaft for locking a depth of the capture net within a pipe and/or the mainline pipe, and for locking an angle of orientation of the capture net in relation to the mainline pipe.

11. A method for extracting a smaller-than-pipe-diameter (STPD) device from a mainline pipe in a low-pressure environment, the method comprising the steps of:
  (a) orienting a capture net located at a distal end of a shaft of a mechanism along a mainline flow direction in the mainline pipe;
  (b) lowering the mechanism with the capture net into a pipe that is in fluid communication with the mainline pipe wherein at least one slider is attached to the shaft between the distal end and a proximal end of the shaft;
  (c) lowering the capture net within the mainline pipe to a right depth;
  (d) deploying the capture net within the mainline pipe such that a hoop assembly and a net assembly a sinker attached to a net cod of the capture net are opened fully within the mainline pipe wherein the hoop assembly has a hoop with a width that resists forces in a flow direction along the width and a thickness that is able in a radial direction through the thickness;
  (e) capturing the STPD device within the net assembly;
  (f) raising the mechanism from the mainline pipe and into the pipe;
  (g) removing the mechanism from the pipe; and
  (h) removing the STPD device from the net assembly.

12. The method according to claim 11 further comprising the step of:
  calibrating a depth gauge to provide position information of the mechanism when the mechanism is inside the pipe and inside the mainline pipe.

13. The method according to claim 11 further comprising the step of:
  after performing step (d) and before performing step (e), securing a shaft locking mechanism so that the hoop assembly, the net assembly, and the capture net remain oriented in the mainline flow direction within the mainline pipe until the STPD device arrives and is captured in the net assembly.

14. The method according to claim 13 further comprising the step of:
  after performing step (e) and before performing step (f), releasing the shaft locking mechanism.

15. The method according to claim 11 wherein step (d) further comprises the step of:
  (d1) validating that the capture net was deployed correctly; and
  (d2) when the validating step (d1) determines that the capture net was not deployed correctly, repeating steps (d) and (d1).

16. The method according to claim 11 wherein step (e) further comprises the step of:
  (e1) verifying that the STPD device was captured in the net assembly before performing step (f).

17. A method for extracting a smaller-than-pipe-diameter (STPD) device from a mainline pipe, the method comprising the steps of:
  (a) orienting a capture net located at a distal end of a shaft of a mechanism along a mainline flow direction in the mainline pipe wherein at least one slider is attached to the shaft between the distal end and a proximal end of the shaft;

(b) lowering the mechanism with the capture net into a pipe that is in fluid communication with the mainline pipe;
(c) sealing a chamber lid against a double-valve chamber within the pipe;
(d) opening a full-bore valve and exposing the double-valve chamber to a pressure from the mainline pipe;
(e) bleeding a bleed valve to vent an excess gas from the double-valve chamber to an exterior environment until the pressure in the mainline pipe and the double-valve chamber is equalized;
(f) closing the bleed valve;
(g) lowering the capture net within the mainline pipe to a right depth;
(h) deploying the capture net within the mainline pipe such that a hoop assembly and a net assembly a sinker attached to a net cod of the capture net are opened fully within the mainline pipe wherein the hoop assembly has a hoop with a width that resists forces in the mainline flow direction along the width and a thickness that is bendable in a radial direction through the thickness;
(i) capturing the STPD device within the net assembly;
(j) raising the mechanism from the mainline pipe and into the double-valve chamber;
(k) closing the full-bore valve;
(l) opening the bleed valve;
(m) removing the chamber lid;
(n) removing the mechanism from the pipe; and
(o) removing the STPD device from the net assembly.

18. The method according to claim 17 further comprising the step of:
   prior to performing step (a), opening the chamber lid of the pipe exposing the double-valve chamber within the pipe.

19. The method according to claim 17 wherein step (c) further comprises the step of:
   calibrating a depth gauge to provide position information of the mechanism when the mechanism is inside the pipe and inside the mainline pipe.

20. The method according to claim 17 further comprising the step of:
   after performing step (h) and before performing step (i), securing a shaft locking mechanism so that the hoop assembly, the net assembly, and the capture net remain oriented in the mainline flow direction within the mainline pipe until the STPD device arrives and is captured in the net assembly.

21. The method according to claim 17 further comprising the step of:
   after performing step (i) and before performing step (j), releasing the shaft locking mechanism.

22. The method according to claim 17 wherein step (h) further comprises the step of:
   (h1) validating that the capture net was deployed correctly; and
   (h2) when the validating step (h1) determines that the capture net was not deployed correctly, repeating steps (h) and (h1).

23. The method according to claim 17 wherein step (i) further comprises the step of:
   (i1) verifying that the STPD device was captured in the net assembly before performing step (j).

* * * * *